Sept. 13, 1966 R. R. ZENK 3,272,570
SPRING LOADED BEARING ARRANGEMENT
Filed Oct. 1, 1963  2 Sheets-Sheet 1
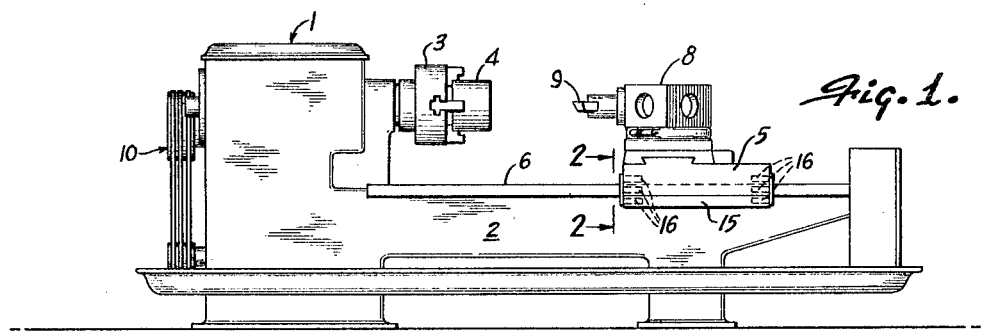
Fig. 1.
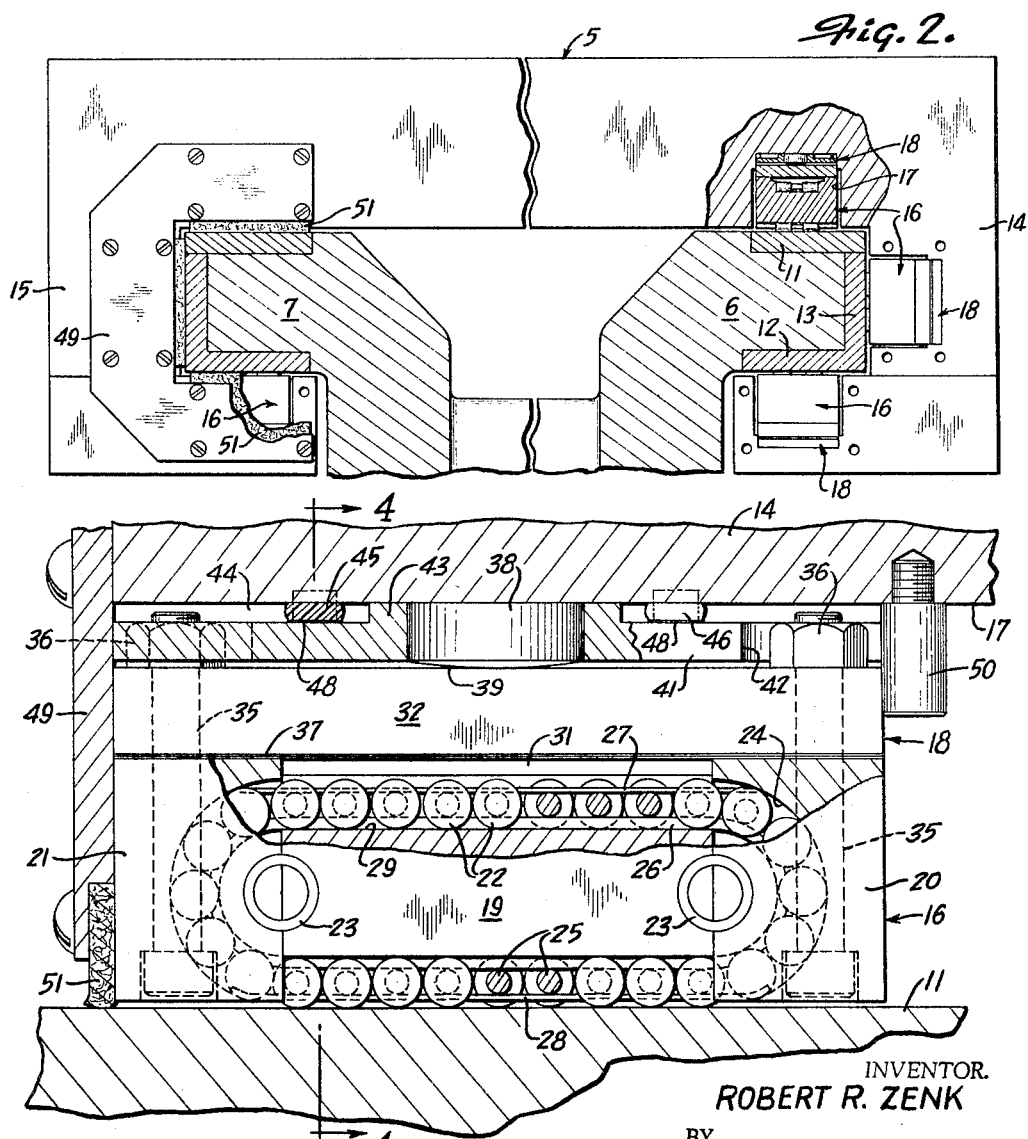
Fig. 2.
Fig. 3.
INVENTOR.
ROBERT R. ZENK
BY
Andrus & Starke
ATTORNEYS Sept. 13, 1966    R. R. ZENK    3,272,570
SPRING LOADED BEARING ARRANGEMENT
Filed Oct. 1, 1963    2 Sheets-Sheet 2
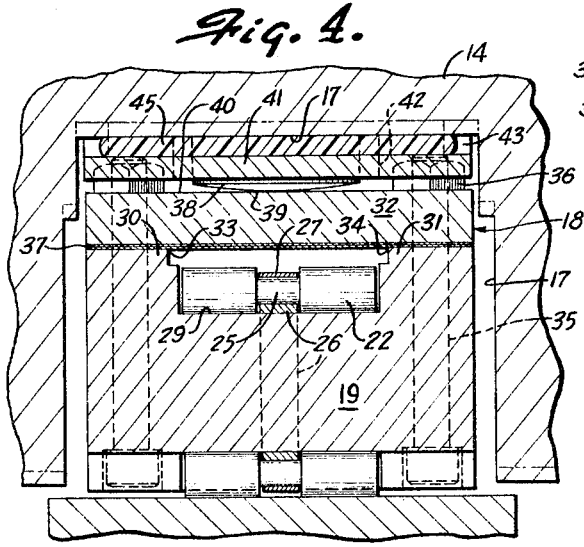
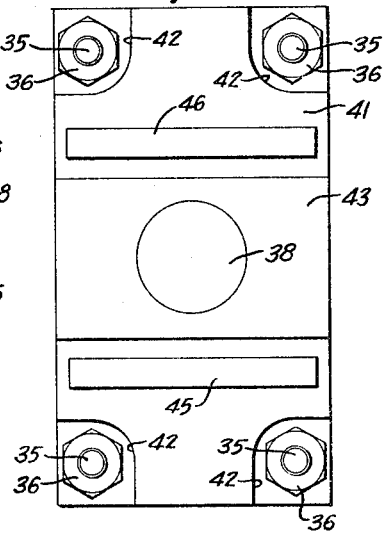
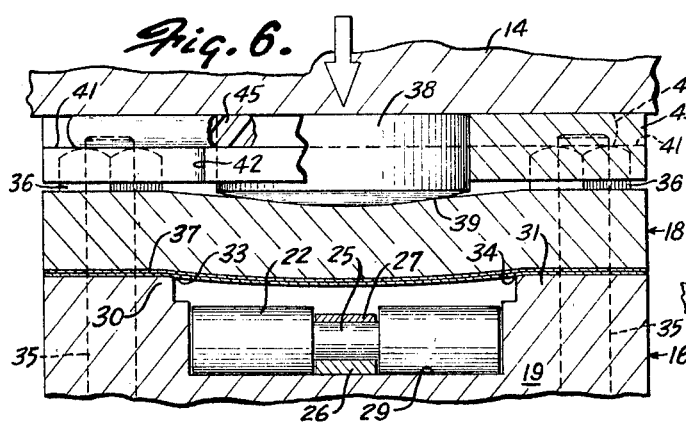
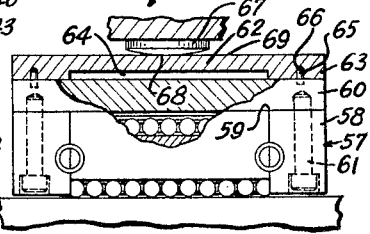
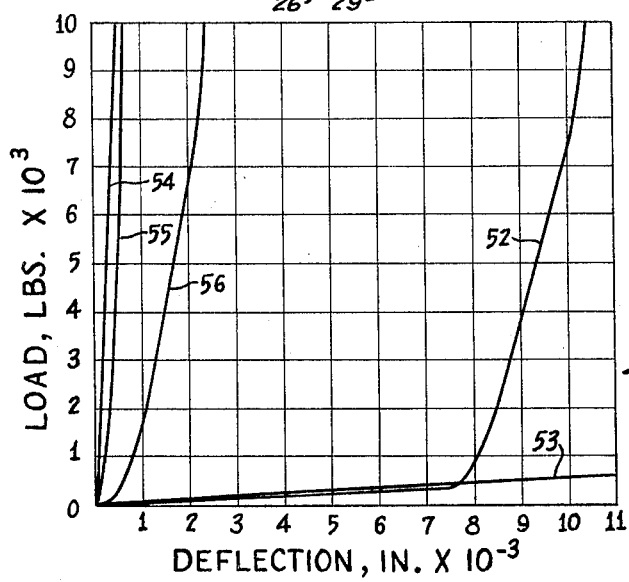
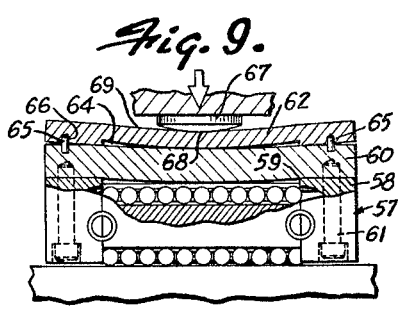
INVENTOR.
ROBERT R. ZENK
BY
Andrus & Starke
ATTORNEYS

United States Patent Office 3,272,570
Patented Sept. 13, 1966

3,272,570
SPRING LOADED BEARING ARRANGEMENT
Robert R. Zenk, Cambridge, Wis., assignor to Gisholt Corp., a corporation of Wisconsin
Filed Oct. 1, 1963, Ser. No. 313,109
7 Claims. (Cl. 308—6)

This invention relates to a load transmitting spring assembly and particularly to an assembly providing a variable stiffness spring assembly particularly adapted to compensate for any misalignment of the load being transmitted through the assembly.

In the assembly of a load bearing member on a support, it is often desirable to provide a spring mounting to obtain predetermined preloading of the load device on the support. For example, in the manufacture of machine tools and the like, a movable carriage member is mounted or supported by spaced roller bearing units upon a bed or other support member. When spring means are interposed between the bearing units and the carriage to preload the mounting of the carriage, the "following" or spring charcteristics of the spring means compensate for manufacturing and assembling tolerances in subsequent movement of the carriage with respect to the bed. Additionally, the controlled preload minimizes bearing deflection when the bearing is subjected to cutting loads. In lathes and similar machine tools, large cutting pressures and cutting speeds are encountered particularly in the more recent applications of cutting tools. The substantial cutting forces are transmitted through the tool and the rolling member onto the supporting bed. Anti-friction bearing members such as those employing recirculating rollers which provide minimal amounts of friction, and frictional variation, are therefore advantageously employed. Such bearing mounting requires maintaining of close parallelism between the load transmitting surfaces of the carriage and the supporting surfaces on which the rollers move. Minute lack of parallelism may result in skewing of the rollers and concentration of the loads on the ends of the rollers. In view of the heavy loads encountered, even the most rigid carriage units have a tendency to deflect any plane normal to the line of force transmission which extends perpendicular to the supporting bed surface.

In such applications, therefore, the stiffness and dimensional stability of the system must be considered in combination with a mounting means preferably maintaining force transmission through the bearing unit perpendicular to the supporting surface.

The present invention is particularly directed to an improved spring assembly of a very small and compact construction providing the necessary stiffness and dimensional stability in the direction of the force transmission. Additionally, in accordance with a further feature of the present invention, a variable spring assembly is provided having a very soft spring characteristic during initial loading of the unit followed by a relatively stiff spring constant or characteristic after the initial loading thereof in combination with a means for maintaining transmission of forces through the spring assembly on a line perpendicular to the supporting surface. The device thus provides a small compact assembly particularly adapted for supporting of heavy loads which are of the type such as employed in machine tools and which may cause slight misalignment or lack of parallelism between the supporting surface and the load transmitting surface.

In accordance with the present invention, a mechanical soft and stiff spring are connected in cascade with a spherical transmission member forming a part of the total spring assembly and interposed to transmit the heavy loads on loaded member to the stiff spring of the assembly. The spring assembly is a multiple section spring comprising a flat plate member spanning a pair of spaced columns with the load being transmitted generally centrally of the beam. The deflection of the flat plate provides a very stiff spring in combination with the deformation of the edges of the supporting beams. Additionally, the transmitted load is through a member having a curved or generally spherical surface of a very large radius engaging the flat plate directly or indirectly. The spherical surface tends to deform the adjacent surface elastically and provides slight additional spring action. The cascaded or stacked spring effect of the spherical member, the flat plate and the edges of the column provide a spring which is adapted to provide exceptional stability and rigidity in the direction of the load while accepting exceptionally high loads.

To provide for ready assembly of the unit and ready movement of the carriage or other supported load member in the absence of the heavy load thereon, a light spring is interposed into the heavy spring system. Thus, in accordance with the aspect of the present invention, relatively soft rubber-like elements are interposed between the load transmitting member and the stiff spring assembly to accept the initial load on the load bearing member. Alternatively, a separate relatively thin metal plate or the like having support edge columns can be stacked upon the stiff spring member with the spherically faced member acting on the back side of the thin metal plate. The thin metal plate will more readily deflect under initial loading to provide a soft spring characteristic until forced into bearing engagement with the stiff spring plate after which the stiff spring characteristic is created.

The present invention has been found to provide a very small compact multiple character spring unit for successively picking up light and extremely heavy loads and is particularly adapted for support of load bearing members movably supported by roller bearing units wherein even the slightest misalignment must be compensated for.

The drawings furnished herewith illustrate the best mode presently contemplated for carrying out the invention.

In the drawings:

FIG. 1 is a front elevational view of a lathe showing a general application of the present invention;

FIG. 2 is an enlarged fragmentary end view taken on line 2—2 of FIG. 1 and showing rolling support units constructed in accordance with the present invention;

FIG. 3 is an enlarged side elevational view of a combined roller bearing and spring unit shown in FIG. 2;

FIG. 4 is an enlarged vertical section taken on line 4—4 of FIG. 3 and showing certain details of the preferred spring construction;

FIG. 5 is a top view of FIGS. 3 and 4;

FIG. 6 is a view similar to FIG. 4 showing the loading of the spring assembly as by tool cutting pressures and the like;

FIG. 7 is a graphic illustration of typical load cell characteristic showing the individual contributions of the several components;

FIG. 8 is a view similar to FIG. 4 illustrating an alternative embodiment of the invention;

FIG. 9 is a view showing the spring assembly of FIG. 8 in the loaded position.

Referring to the drawings and particularly to FIG. 1, the present invention is shown incorporated as a part of a turret lathe 1 having a fixed supporting bed 2. A chuck 3 is provided adjacent the one end of the supporting bed 2 with a workpiece 4 releasably secured therein in overlying relationship to the bed 2. An adjustable carriage 5 is supported on a pair of longitudinal ways 6 and 7 extending rearwardly for the complete length of the supporting bed 2. A tool turret 8 is releasably fixed to the carriage 5 and supports one or more tools 9 for movement into cutting engagement with the workpiece 4. A rotating drive 10 is coupled to the chuck 3 in any suitable manner, not shown, and is adapted to rotate the workpiece while the carriage 5 is moved to establish a predetermined cutting engagement of the tool 9 and with the rotating workpiece 4 in accordance with known practice.

Referring particularly to FIGS. 1 and 2, the upper portion of the bed 2 is generally formed as a U-shaped member having outwardly and laterally extending rectangular guides or ways 6 and 7. Each of the ways 6 and 7 is similarly constructed with an upper supporting wall 11, a lower supporting wall 12 and a vertical or outer side supporting wall 13. Carriage 5 is generally an inverted U-shaped member having depending arms or side portions 14 and 15 which are aligned respectively with the supporting ways 6 and 7. Each of the side portions 14 and 15 further includes complementing enlarged passageways mating with the ways 6 and 7. A plurality of similar roller bearings 16 is secured one each within suitable generally rectangularly milled cavities 17 in the front and back portions of the arm portions 14 and 15 to support the carriage 5 for rolling movement along the ways 6 and 7. Thus, in the illustrated embodiment of the invention, three roller bearings 16 are secured within the front and back portions of each arm portion 14 and 15 to support the opposite ends of the carriage 5 in rolling engagement with the ways 6 and 7 and slightly spaced therefrom. For purposes more fully discussed hereinafter, a load cell 18 which is constructed in accordance with the present invention is secured to the back side of each of the bearings 16 and engages the base of the corresponding cavity 17 which is formed to be parallel to the corresponding supporting wall. The load cell 18 provides an improved preloaded mounting of the carriage 5 on the bearings 16 for transmitting the forces through the bearing 16 to the supporting walls 11–13 of longitudinal ways 6 and 7 on a line perpendicular to the respective supporting walls regardless of slight deflection of the carriage 5.

Each of the illustrated roller bearings 16 and the related load cell 18 is similar in construction and a single assembly is shown in detail in FIGS. 3–6 to clearly illustrate and explain the functioning of the present invention.

Referring to the drawings and particularly to FIGS. 3 and 4, the illustrated roller bearings 16 are of a known recirculating anti-friction roller bearing construction and includes a solid metal roller race 19 of a rectangular construction and end caps 20 and 21 secured to opposite ends of race 19 in combination with a plurality of center guided rollers 22 which are mounted for continuous longitudinal circulation about the race. The end caps 20 and 21 are secured in place by annular pins 23 driven into correspondingly shaped annular grooves extending between the race 19 and end caps 20 and 21. The rollers 22 move between the lower or the supporting surface position and the upper surface of race 19 through end return channels or recesses formed in end caps 22 and 23. The caps 22 and 23 are secured abutting the opposite ends of the race 19 and each includes an inner half moon recess 24 adjacent the race 19 to accommodate the rollers. Each of the rollers 20 includes a centrally reduced guide portion 25, as shown most clearly in FIG. 4, which mates with a guide rail 26 encircling the race. Rail 26 has curved ends for directing the rollers 22 about the race and through the end caps. Guide rails 27 and 28 are secured extending longitudinally of the bearing 16 in mating relationship with the outer portion of roller recesses and secured in place by projection of the ends into the end caps 20 and 21 as shown in FIG. 3. The upper surface of the race 19 is centrally and longitudinally recessed as at 29 to form a return channel for the rollers 22 with the upper surface or plane of the rollers therein disposed below the corresponding uppermost side portions of race 19 which define a pair of supporting columns 30 and 31 having corresponding coplanar upper mounting surfaces for mounting of the load cell 18 thereon.

The rollers 22 of the respective bearing units 16 continuously roll on the corresponding supporting surface or walls 11–13 and transmit the forces applied to the bearing to corresponding ways 6 and 7. Roller bearings of this variety are known to provide a very low friction, low frictional variation and long accuracy life in normal usage. However, it is highly important the loads be transmitted perpendicularly to the surface on which the rollers ride and that the roller bearing 16 is not twisted about either of the two axes normal to each other and to the perpendicular line of transmitting force. However, heavy load applications such as heavy tool pressures encountered in a modern lathe and the like at times cause slight deflection of the carriage with respect to the longitudinal ways 6 and 7 and thus destroy the most carefully machined parallel relationship between the supporting surface and the load transmitting surface of the carriage 5.

The load cell 18 of the present invention provides a preloading spring mounting including means to establish a desirable magnitude of preload, and means to compensate for any such misalignment of the carriage 5 such that proper force transmission is maintained at all times while facilitating and compensating for assembly tolerances and such that the gap between the supporting wall and the carriage cavity can be increased without removal of a preload as hereinafter described.

Referring to the drawings and particularly to FIGS. 3–5, the illustrated embodiment of the present invention includes a heavy flat beam plate 32 which spans the back side of the bearing race 19 and is supported by the raised side portions or columns 30 and 31 of the race. The illustrated columns 30 and 31 include relatively sharp inner edges 33 and 34 immediately adjacent the plate 32 for purposes more fully described hereinafter.

The plate 32 is secured by a plurality of bolts 35 which project through the four corners of the race with clamping nuts 36 on the upper side to securely interconnect the plate 32 to the race 19.

Spacing shims 37 are interposed between the plate 32 and the supporting columns 30 and 31 of such dimension as to secure a desired preload, and to properly locate carriage 5 on the load cell unit 18 and attached bearing 16 with the supporting rollers 20 on the corresponding supporting surface of the ways 6 or 7.

The plate 32 is formed of any suitable metal such as tungsten carbide which has a very high modulus of elasticity. A heavy load imposed on the central portion of the plate 32 between the supporting columns 30 and 31 will deflect the plate inwardly between the columns as shown in FIG. 6 and provide a very stiff spring characteristic. Additionally, the side edges 33 and 34 of columns 30 and 31 will be deformed elastically to provide an additional spring action under heavy loads such as encountered in machine tools and the like.

The load in accordance with the illustrated embodiment of the invention in FIGS. 3 and 4 is transmitted through a load transmission disc 38 having a crowned spherical surface or face 39 resting on and engaging the flat back surface or face 40 of plate 32. The disc 38 is centrally located on the plate 32. The spherical face 39 has an extremely large radius; that shown in the drawings being greatly reduced for purposes of showing there is such a radius. In actual practice, the radius will preferably be so large as not to be discernible with the naked eye. The top side of the disc 38 is provided with a planar face engageable by the base of the recess 17 for transmission of the loads through the disc 38 to the flat plate and thereby through the roller bearing. The generally spherical surface or face 39 when heavily loaded will elastically deform the adjacent face of the plate 32 and provide additional heavy spring action. The disc 38 is formed of any suitable material having sufficient stiffness and load bearing capacity to function as set forth herein. For example, a tungsten carbide which has a large material stiffness has been found to function in a highly satisfactory manner. Alloy steel of the variety employed in rolling bearing elements which have a high order of hardness, such as 62–64 Rockwell C hardness will also provide satisfactory results.

Further, if the load is not exactly perpendicular to the supporting surface 11 of the way 6, the disc 38 will rotate slightly on its spherical face 39 and maintain transmission of the forces perpendicular to the supporting way wall or surface 11 and thereby effectively compensate for any slight deflection of the carriage with respect to the bed 2.

The spherical or load transmission disc 38 is shown fixedly secured as by a press fit within an opening in a support plate 41 generally of the configuration of plate 32. The four corners of plate 41 are removed as at 42 to accommodate the upper ends of the clamping bolts 35 and the associated clamping nuts 36. The support plate 41 is secured spaced upwardly from the plane of the spherical base 39 to provide a slight spacing between plate 41 and the back face 40 of spring plate 32 to allow the previously noted tilting movement of the disc 38. The back side of the plate 41 is provided with a rectangular, laterally extending raised ledge 43 in the area aligned with the disc 38 to provide a space 44 between the general plane of the plate 41 and the base of the carriage recess 17.

A pair of resilient strips 45 and 46 extend parallel to the ledge 43 one on each side thereof. In a relaxed or no load position as shown in phantom in FIGS. 3 and 4, the resilient strips 45 and 46 extend upwardly above the plane of the ledge 43 and the disc 38 and positively hold the bearing 16 in position. The resilient strips 45 and 46 may be formed of any suitable soft elastic material and may be secured to the plate in any suitable manner as by adhesive bonding with an adhesive 48. For example, a urethane elastomer having a durometer hardness of 80±5 has been satisfactorily employed in a machine tool support.

The load is thus transmitted through the resilient strips 45 and 46 until they are fully compressed and the base of recess 17 moves into engagement with the raised ledge 43 and the load transmission disc 38 after which the load or force is directly transmitted to the spring plate 32. The load cell unit 18 and corresponding bearing 16 are secured within the recess 17 in any suitable manner. In the illustrated embodiment of the invention, a face plate 49 is bolted or otherwise secured to the end face of the carriage 5 and extends over the openings of the recess 17 for the several assemblies to securely lock them within the respective recesses 17. A backing pin 50 projects inwardly from the base of the recess 17 and into the path of the load cell 18 to properly clamp the unit longitudinally within the recess, as shown in FIG. 3. Suitable wiping members 51 may be clamped between the securing plate 49 and the end face of the carriage 5 to clean the way in front of the bearing 16 to prevent undue entrance of dirt, dust and the like therebetween which would adversely affect the rolling characteristic of the rollers 22.

Generally, the illustrated embodiment of the invention operates and functions in the following manner. The roller bearing 16 is assembled with the flat plate 32 and with such necessary shims 37 required by the machining tolerance of the depth of the recess 17 to provide a predetermined spacing of the carriage with respect to the ways 6 and 7. The bearing 16 and cell 18 are located within the recess 17. The resilient strips 45 and 46 are relatively soft springs which may be readily deflected during assembly to provide a predetermined preloading of the bearing 16. Plate 49 is secured to the end faces of the carriage 5 to securely lock the roller assemblies within the corresponding recesses. The shims 37 are employed to maintain a predetermined minimal predesigned preloading of the bearing assembly in the no load position with respect to the carriage loads.

During operation of the lathe, the initial loading of the carriage 5 compresses the resilient strips 45 and 46 transmitting the load equally to opposite sides of the spherically faced disc 38 and thereby transmitting the load through the plate 31 of each roller bearing 16 and onto the supporting ways 6 and 7. As the load increases, strips 45 and 46 compress until the base of the recess 17 engages the back side of the transmission disc 38. Thereafter, the load is transmitted through the disc 38 to the spring plate 32. As the load increases, the spherical surface or face 39 acting on the flat surface 40 will cause deformation thereof providing a slight spring action. The plate 32 also deflects as a beam between the supporting columns 30 and 31 providing additional spring action. The edges 33 and 34 of the columns 30 and 31 deform to provide an additional spring action. The effect of the bending of the plate as a beam and the edge effect provide relatively small spring action with the spherical surface on the flat plate providing a somewhat greater spring action. The actions are cumulative and provide a complete heavy load spring action for transmitting of the loads in a very stable system including the necessary stiffness and dimensional stability for rolling support of a tool carriage and the like. The spherical face 39 of the load transmission discs 38 provides the necessary compensation for any misalignment between the normally parallel surfaces of the carriage 5 and the supporting ways 6 and 7.

FIG. 7 graphically illustrates a typical load cell characteristic of an assembly constructed in accordance with the above teaching. FIG. 7 includes the characteristic curve 52 for the complete assembly and individual characteristic curves 53, 54, 55 and 56 for the elastometer strips 45 and 46, the bending or deflection of plate 32, the deformation of edges 33 and 34 and the deformation of plate 32 by the crowned or spherical surface 39 of disc 38. The curve 52 clearly illustrates the dual spring characteristic with the characteristic of the resilient strips 45 and 46 greatly predominating to a deflection of .00775 at a load of 350 pounds at which point a very sharp knee is formed and the characteristic curve 52 rises sharply in accordance with the cumulative effect of the characteristic curves 54, 55 and 56.

The advantages of the illustrated embodiment of the invention particularly reside in the relatively small compact configuration providing not only the soft spring characteristic for low loads and substantial separation of the carriage relative the way without loss of preloading and ease of assembly but the high spring characteristic providing necessary stiffness and dimensional stability for accepting heavy working loads in combination with the compensating force transmission providing the necessary alignment if in the event torque movement about the axes in a plane perpendicular to the load transmission axes exists.

Although the invention has been particularly described as applied to rectangular ways, it can be readily applied to any other way structure or other applications requiring the characteristics of the novel spring assembly. For example, it will be readily understood by those skilled in the lathe support art that with V-shaped, laterally extending ways, the invention provides the very important function of maintaining a load on a bearing support where the carriage and way have separated in accordance with the cumulative movement at the other bearing support. This result is obtained by the soft spring characteristic which provides for substantial movement without loss of load.

An alternative embodiment of the invention providing generally the same characteristics and advantages heretofore discussed is shown in FIGS. 8–9. Generally, the embodiment of the invention shown therein includes a roller bearing 57 generally corresponding to the roller bearing 16 having supporting columns 58 with the edges 59. A spring plate or beam 60 is secured to the raised side portions or columns 58 by bolt units 61 which are threaded into suitably tapped openings in plate 60. In this second embodiment, plate 60 will be formed of steel as heretofore described to permit tapping for bolts 61.

In the present invention, a thin steel spring beam plate 62 is stacked upon the main or the heavy spring beam plate 60 and includes depending narrow leg portions 63 extending perpendicular to the columns 58 along the shorter edge of plate 62 and resting directly upon the back side of the plate 60. A space 64 between the central portions of the plates 60 and 62 is provided by the leg portions 63. Pins 65 are secured to plate 60 and project upwardly into locating recesses 66 in plate 62 to properly locate the latter.

A load disc 67 is interposed between the recess 17 and the back side of the thin spring plate 62 and is provided with a face 68 forming a part of a sphere engaging the flat back face 69 of plate 62 generally in accordance with the previous mounting of the load transmission disc 38 of the first embodiment.

The second embodiment of the invention functions with the load being transmitted directly from the carriage 5 through the load transmission disc 67, the soft spring plate 62 and the stiff spring beam 60 to the bearing 57. The thin spring plate 62 is relatively readily deflected to provide an action generally corresponding to the resilient strips 45 and 46. As the preload is applied, the spring plate 62 is deflected and moves into engagement with the central back portion of the beam or plate 60. Further loading of the assembly directly loads the plate 60 which deflects to provide spring action as heretofore described including the deflection of the plate 60 and the deformation of the edges 59 of the bearing columns 58. The surface of plate 62 will also be deformed elastically by the disc 67.

The second embodiment of the invention thus provides the combined dual spring characteristic as well as a very stable stiff spring for accepting heavy loads in a small compact assembly.

In manufacture and assembly and application of the spring device of the present invention, the total spring action can be plotted to provide known curves and characteristics.

Although preferred constructions are given, the invention may be varied in its detail without departing from the present invention as more fully defined in the claims. Further, although shown supporting a lathe carriage, the invention may be applied to any other support including movable and fixed supports, wherein the dual spring characteristic may provide for an interference fit and preloading and where a misalignment feature may be desirable. Thus, the present invention could be readily and advantageously used in supporting of the turret 8 on the carriage slideway.

The present invention provides an improved multiple character spring unit to support substantial loads and which may be made small and compact.

Various modes of carrying out the invention are contemplated as being within the scope of the following claims particularly pointing out and distinctly claiming the subject matter which is regarded as the invention.

I claim:
1. A spring loaded rolling mounting assembly comprising
    (a) a fixed support member having a planar supporting wall,
    (b) a movable member having a planar wall,
    (c) a recirculating roller bearing having a body with a back mounting wall and a plurality of recirculating cyclindrical rollers defining a planar rolling surface opposite the back mounting wall, said bearing being disposed on the fixed support member with the rollers on the planar supporting wall,
    (d) a mechanical spring unit disposed between the movable member and the roller bearing, said spring unit including a first mechanical spring having a spring constant deflectable under initial loading and a pair of columns extending perpendicularly to the planar wall of the movable member and having a spring beam spanning and bearing upon said pair of columns, said beam constituting a spring having a substantially higher spring constant deflectable after substantially complete deflection of the first spring portion, and
    (e) said spring unit having a crowned force transmitting surface establishing self-alignment of the load forces on the movable member to establish perpendicular forces on the spring unit and the roller bearing.

2. The spring loaded rolling mounting assembly of claim 1 wherein said crowned surface is formed on a separate plate-like member disposed between the beam and the movable member and is located centrally of the beam.

3. The spring loaded rolling mounting assembly of claim 1 wherein said crowned surface is formed as a part of a separate plate-like member disposed between the beam and the movable member, said plate-like member having a central hub within which a disc member is secured with said crowned surface on the outer end of the disc and engaging the beam centrally of the columns, and said first mechanical spring being resilient members disposed between the movable member and the plate-like member to opposite sides of the disc member.

4. The spring loaded rolling mounting assembly of claim 1 wherein said first mechanical spring constitutes a second beam supported on opposite ends by supporting columns and said crowned surface engages the central portion of the second beam.

5. In a spring assembly,
    (a) an anti-friction recirculating roller bearing having a race with rectangular columns integrally formed along the back edge portions, said column having sharp inner edges,
    (b) a metal beam plate secured to said column and spanning the space between said columns,
    (c) a load receiving plate unit having a central disc member protruding from one side thereof, said protruding portion having a crowned surface engaging the back side of the metal plate centrally between said columns and having a raised portion on the back side aligned with the disc and defining a load receiving portion, and
    (d) a pair of resilient means secured to the back side of the load transmitting plate, one each to opposite sides of the raised portion and projecting outwardly of the plane of the raised portion to provide an initial load receiving surface, a load thereon acting to compress said resilient means and then engaging said raised portion to transmit the load through the central disc, said metal beam plate deflecting between said columns with elastic deformation of the inner edges of the column and the beam plate being deformed to provide a cumulated heavy spring action.

6. In a spring mounting assembly,
    (a) a roller bearing having spaced upstanding load receiving columns,
    (b) a first metal beam plate spanning the space between said columns and being secured at the outer ends to the columns, said metal beam plate being deflected inwardly between the columns in response to predetermined loading thereon,
    (c) a second metal beam plate having a pair of integral end columns bearing on the back side of the metal plate and being deflectable at substantially smaller loads than said first metal beam plate, and
    (d) a load disc having a surface defining a portion of a sphere disposed in engagement with the center of said second metal beam plate and having a planar back surface for carrying a varying load.

7. The spring mounting assembly of claim 6, wherein said roller bearing is an anti-friction recircuating roller bearing having a race with columns of rectangular cross section integrally formed along back edge portions.

References Cited by the Examiner

UNITED STATES PATENTS

| | | | |
|---|---|---|---|
| 54,227 | 4/1866 | Smith | 267—3 |
| 596,280 | 12/1897 | Short | 308—244 X |
| 1,215,342 | 2/1917 | Coswell | 308—26 |
| 1,306,653 | 6/1919 | Wingfield | 308—26 |
| 1,601,803 | 10/1926 | Kiesel | 105—224 X |
| 1,846,326 | 2/1932 | Flint. | |
| 1,911,330 | 5/1933 | Symington | 267—4 |
| 1,913,241 | 6/1933 | Kuse. | |
| 1,976,937 | 10/1934 | Haseltine | 105—197 |
| 2,246,588 | 6/1941 | Harrall | 308—231 |
| 2,652,241 | 9/1953 | Williams | 248—21 X |
| 3,140,866 | 7/1964 | Zoller | 267—3 |

FOREIGN PATENTS

| | | |
|---|---|---|
| 685,665 | 7/1930 | France. |
| 720,909 | 6/1942 | Germany. |

DAVID J. WILLIAMOWSKY, *Primary Examiner.*

DON A. WAITE, *Examiner.*

L. L. JOHNSON, *Assistant Examiner.*